United States Patent [19]

Akae

[11] 4,026,802
[45] May 31, 1977

[54] WASTE WATER TREATMENT APPARATUS BY BIOLOGICAL ACTION

[75] Inventor: Kiyosi Akae, Kyoto, Japan

[73] Assignee: Unitika Ltd., Amagasaki, Japan

[22] Filed: Aug. 18, 1976

[21] Appl. No.: 715,583

[30] Foreign Application Priority Data

Aug. 20, 1975   Japan .................. 50-115562[U]
Oct. 30, 1975   Japan ...................... 50-131181

[52] U.S. Cl. ............................ 210/151; 210/16
[51] Int. Cl.² ........................................ C02C 1/04
[58] Field of Search ............ 210/150, 151, 17, 15, 210/16, 324, 325, 262, 264, 391, 393, 44, 220, 221 P, 14, 400, 401

[56] References Cited

UNITED STATES PATENTS

| | | | |
|---|---|---|---|
| 563,811 | 7/1896 | Scowden | 210/150 |
| 798,908 | 9/1905 | Kremer | 210/150 |
| 1,799,299 | 4/1931 | Johnston | 210/400 |

FOREIGN PATENTS OR APPLICATIONS 199,573   9/1958   Austria ...................... 210/400

Primary Examiner—Thomas G. Wyse
Assistant Examiner—Benoit Castel
Attorney, Agent, or Firm—Sughrue, Rothwell, Mion, Zinn & Macpeak

[57] ABSTRACT

A biological waste water treating apparatus in which plural cylindrical filter beds suspended on an endless chain and the like at definite intervals are circulated in a treating tank containing waste water to perform the aerobic treatment of the waste water or aerobic treatment and anaerobic treatment of the waste water. Washing of the filter beds is carried out effectively without stopping the operation.

8 Claims, 4 Drawing Figures

WASTE WATER TREATMENT APPARATUS BY BIOLOGICAL ACTION

BACKGROUND OF THE INVENTION

1. Field of the Invention

The present invention relates generally to biological waste water treatment and, more particularly, to a biological waste water treating apparatus which can be operated stably and efficiently for a long period of time.

2. Description of the Prior Art

Hitherto, as an aeration type activated sludge treatment apparatus for industrial waste water, municipal waste water, etc., (hereafter, they are simply called "waste water" in this specification), a fixed bed system and a moving bed system have been employed. In such systems an aerobic condition or an aerobic condition and an anaerobic condition are utilized. However, since in these conventional systems, activated sludge deposits and accumulates in filter beds excessively when they are used for a long period of time, the contact effect between waste water treated and bioactive membrane is reduced to prolong a period of time required for finishing the treatment. Therefore, in order to remove the activated sludge thus accumulated, it is necessary to wash the filter beds, but that is inconvenient because the operation of the waste water treatment system must be stopped during washing. An attempt to wash the filter beds without stopping the waste treatment operation in a conventional system has been proposed, but when such a technique is put into practice, a large amount of activated sludge deposits in the treating tank and the recovery of the activated sludge from the tank for precipitation treatment is accompanied by a large amount of water to be treated, which results in the requirement of a large settling tank.

SUMMARY OF THE INVENTION

It is an object of the present invention to overcome the above mentioned disadvantage of conventional systems and to provide an improved waste water treatment apparatus which can be operated with a shortened treatment period, an improved treatment efficiency, and a stablized function. According to the present invention, there is provided a waste water treating apparatus operating by biological action, comprising a treating tank including plural cylindrical filter beds swingably suspended on an endless chain and the like at definite intervals by means of shafts equipped to the filter beds, said filter beds being circulated in such manner that a part of the filter beds are always outside water to be treated, said water to be treated in the treating tank forming a circulating water course by repeating the upward movement thereof by the aid of bubbles diffused from the bottom of the tank through a cavity type partition placed in water to be treated and the downward movement thereof, said filter beds being so circulated that after emerging from the water course in the tank, the filter bed is successively supplied with feed water and washing water, enters the water course from the upwardly moving side, and emerges from the water course from the downwardly moving side. Alternatively the filter bed is successively supplied with feed water and washing water, enters the water course from the downwardly moving side and emerges from the water course from the upwardly moving side, and said water used for washing being separately treated outside the tank.

DETAILED DESCRIPTION OF THE PREFERRED EMBODIMENT

Now, the invention will be explained in detail by referring to the embodiments illustrated in the accompanying drawings.

Figure 1:
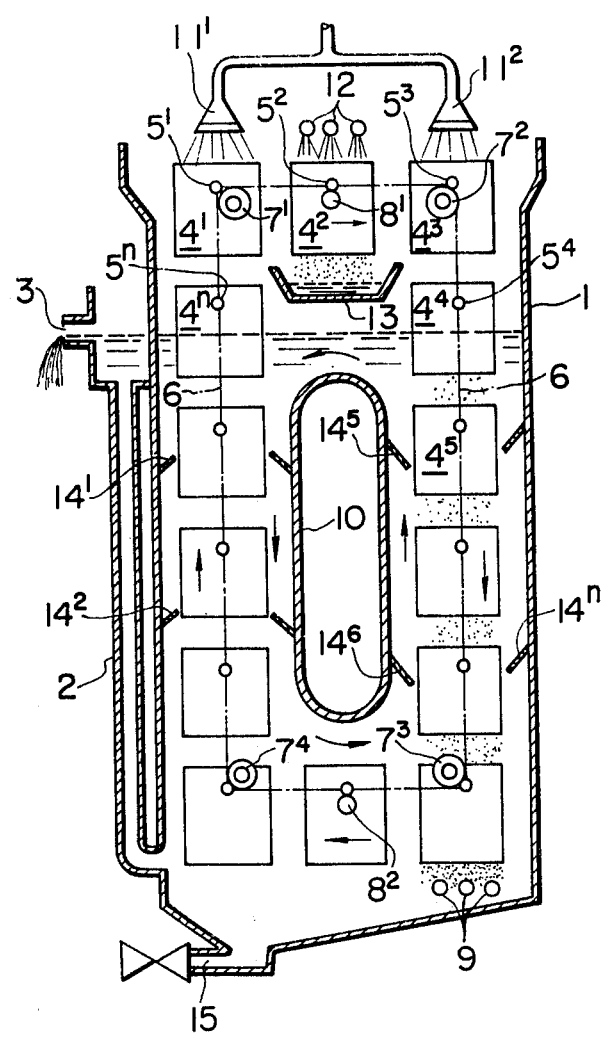
FIG. 1 is a schematic cross sectional view showing an embodiment of the apparatus of this invention.

FIG. 1 illustrates an example of the waste water treatment apparatus of this invention applied for treating municipal sewage, in which numeral 1 designates a vertical type treating tank capable of containing water to be treated at a depth of 4–6 meters. The tank 1 has a treated water outlet pipe 2 connected to the lower portion of the tank on the side thereof where the water is downwardly moving. The pipe extends upwardly to an outlet 3 equipped to an upper part of the tank, whereby water to be treated in the tank is kept at a constant level. The tank 1 contains plural cylindrical filter beds $4^1$–$4^n$, each composed of materials capable of easily passing water therethrough in a vertical direction. As an example, they may be plastic corrugated plates disposed vertically at intervals of 20–40 mm. The filter beds $4^1$–$4^n$ are swingably suspended on an endless roller chain 6 by means of shafts $5^1$–$5^n$ fixed to the side walls of the filter beds $4^1$–$4^n$, respectively, at a position above the center of the side wall. The chain 6 is circulated by means of sprockets $7^1$–$7^4$ so that the greater number of the filter beds $4^1$–$4^n$ are always in the water being treated and a smaller number of the filter beds are outside the water. In this case, one of the sprockets $7^1$–$7^4$ is connected to a driving means (not shown) to drive the chain 6, and the chain 6 is supported by supporting rollers $8^1$ and $8^2$. Also, water to be treated in the tank 1 moves upwardly in response to a large amount of fine bubbles released from a bubble inlet 9 equipped at the lower part in the tank 1. After crossing over a cavity type partition 10, placed in the tank, the water moves downwardly. Thus a circulating water course is formed in the tank. In the embodiment illustrated in FIG. 1, the circulating direction of the filter beds $4^1$–$4^n$ is opposite to the circulating direction of the water.

The filter beds are circulated at a rate of one revolution per 6–12 hours. The filter bed $4^1$ is shown emerging from the water course in the tank 1 and being showered with water from a settling tank by means of a sprinkler $11^1$. The water from the settling tank prevents the filter bed from drying so that it can exhibit its function immediately upon reentry in the water course. When the filter bed shifts to the position as shown by filter bed $4^2$, washing water is applied to the filter bed through jet nozzles 12 to wash away the activated sludge from the filter bed. The wash water and activated sludge removed from the filter bed is transported outside the tank through a water receiver 13 for separating the activated sludge by settling. The filter bed then shifts to the next station as shown by bed $4^3$, where it is supplied again with water through a sprinkler $11^2$. The filter bed then enters the water course by the subsequent movement of the circulation system.

Rubber guide vanes $14^l$–$14^n$ are equipped to the inside wall of the tank 1 and the wall of the cavity type partition 10 for lightly supporting the filter beds $4^1$–$4^n$ and at the same time effectively leading water to be treated into the filter beds. Also, the tank 1 is equipped with an outlet 15 at the bottom thereof for withdrawing activated sludge, etc., deposited in the tank.

Figure 2:
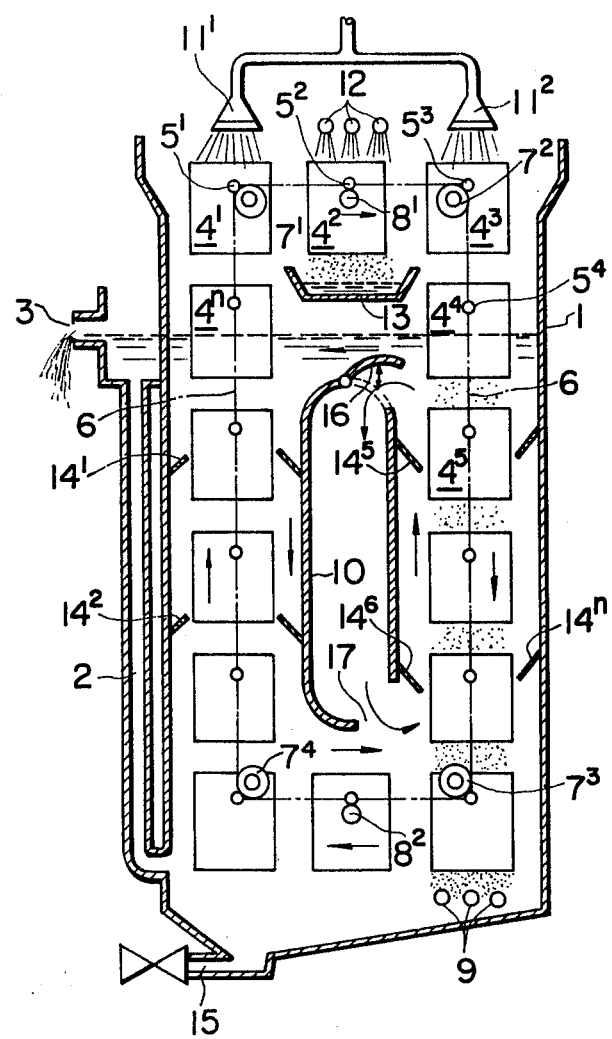
FIG. 2 is a schematic cross sectional view showing another embodiment of the apparatus of this invention.

FIG. 2 shows another embodiment of the apparatus of this invention, in which an improvement of the apparatus shown in FIG. 1 is illustrated. That is, in the improved embodiment of this invention, a damper 16 which can be opened toward the upwardly moving side of water is equipped to the upper part of a cavity type partition 10, and further an opening 17 is formed at the lower portion of the partition 10 facing the upwardly moving side of water. When the damper 16 is closed, all of the water moving upwardly by the action of the large amount of fine bubbles supplied through bubble inlet 9 is, after crossing over the partition 10, circulated as the downwardly moving water stream. In this case, the dissolved oxygen remaining without being consumed in the upwardly moving water (which is an aerobic zone) transfers as it is into the downwardly moving water stream (which is an anaerobic zone). Therefore, if the amount of bubbles is increased for the purpose of increasing the amount of dissolved oxygen for the aerobic zone, the speed of the upwardly moving stream is increased, which inevitably results in increasing the amount of dissolved oxygen transferred to the anaerobic zone.

Now, in this case, the faculty of removing BOD (Biochemical Oxygen Demand) and COD (Chemical Oxygen Demand) and the nitrification of ammoniacal nitrogen in the aerobic zone has an intimate correlation with the amount of dissolved oxygen but, on the other hand, it is desirable to have a very low amount of oxygen in the anaerobic zone. Accordingly, for reducing the amount of dissolved oxygen in the anaerobic zone, additional components of BOD and COD can be added to water in the anaerobic zone to consume the dissolved oxygen, but in order to accomplish the latter it is necessary to control the mixing ratio of water supplied through the sprinklers $11^1$ and $11^2$ and the additional components of BOD and COD contained in the water.

The damper 16, which can be opened toward the upwardly moving water stream at the upper portion of the cavity 10, and the opening 17, facing the upwardly moving stream at the lower portion of the cavity, can be opened to permit the amount of dissolved oxygen in the aerobic zone to be increased to an effective amount without adversely affecting the anaerobic zone. By measuring the amount of dissolved oxygen at position X, by conventional means the amount of water transferring between zones can be controlled by adjusting the extent of the opening of the damper 16 so that water transferred to the anaerobic zone contains a fitting amount of dissolved oxygen for the anaerobic zone. Therefore, in the apparatus illustrated in FIG. 2, water containing a comparatively large amount of dissolved oxygen descends by the action of the damper 16 through the short passageway formed in the cavity type partition 10, flows from the opening 17 formed at the lower part of the cavity type partition 10, and reenters the upwardly moving stream to promote the aerobic condition of the aerobic zone.

Figure 3:
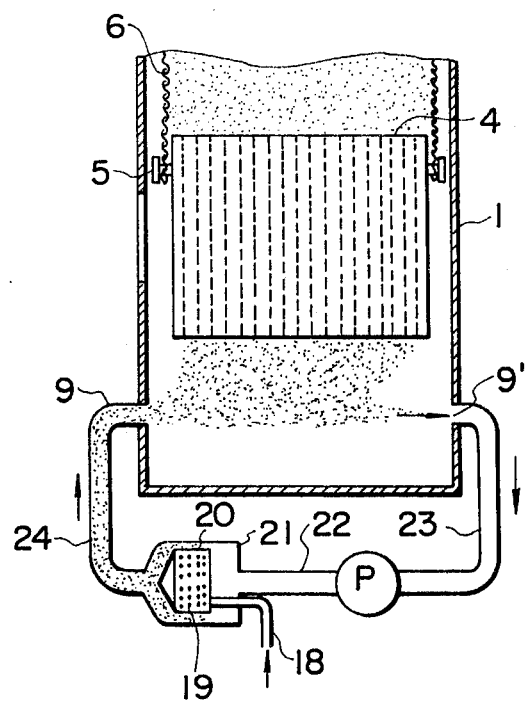
FIG. 3 is a schematic side view showing an embodiment of a diffuser or bubbling means used in the apparatus of this invention.

FIG. 3 is a side sectional view showing a part of the lower portion of the apparatus of this invention and is an enlarged schematic view of a diffuser or a bubbling means which is a part of the apparatus of this invention. In the treating tank 2, as explained above, a filter bed 4 is suspended on an endless roller chain 6 by means of a shaft 5 in waste water of the aerobic zone: Fine bubbles are supplied from the lower part of the tank into the filter bed 4 to oxidatively treat waste water by the bioactive membranes on the surfaces of the filter bed. At the same time treated water rises through other filter beds by the aid of the upward flow of the bubbles and is transferred at the upper part of the tank to the anaerobic zone. Thus, water to be treated is circulated through the tank.

For effectively oxidizing aerobic dissolved matters in the waste water, it is required that the bubble-containing water supplied from the diffuser contains a large amount of air, a large proportion of fine bubbles, and does not form vortex motion of the water in the tank. The last requirement is for properly keeping biomembranes on the surfaces of the filter beds.

The diffuser used in this invention is composed of an outer cylinder 21 containing a diffuser tube or cylinder 20 having a large number of air diffusing holes 19 formed on the surface thereof which is parallel to the walls of cylinder 21. The tube is connected to an air pipe 18, and is otherwise closed at both ends. There is a space for passage of water between the inner wall of cylinder 21 and the outer wall of tube 20. Also, the outer cylinder 21 is connected to a water supply pipe 23 through a pipe 22 and a pump P, and the water supply pipe 23 communicates with a suction hole 9' of the tank 1. The outlet side of the outer cylinder 21 is connected to a pipe 24, and the latter is connected to a bubble-containing liquid inlet 9 of the tank 1. The suction hole 9' and the bubble-containing liquid inlet 9 are formed at the lower portion of the filter bed.

Figure 4:
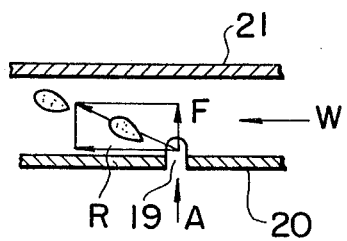
FIG. 4 is a schematic view showing a mode of forming a bubble-containing water stream by the diffuser.

The effective bubble-containing liquid from the diffuser is formed by spurting air from diffuser holes of the diffuser tube and at the same time forceably applying a high speed liquid stream to the air spurting direction at the shearing direction thereof. For example, referring to FIG. 4, if the diffuser tube 20 is disposed in the outer cylinder 21 such that water passes through the space therebetween at a speed above 10 meters/sec. while carrying air at an amount of 10–70% of the water, bubbles are finely dispersed in the liquid by the force R induced from the spurting force F of bubbles A and the force W of the high speed liquid.

As a result of the configuration of the diffuser used in this invention a large amount of air is dissolved in the water supplied, a large amount of fine bubbles are contained in the liquid, and a regular flow of bubble-containing water is obtained in the tank. Thus, when such a diffuser is employed, no vortex motion of water is formed in the tank and an excellent upwardly moving flow of water is obtained by the action of a large amount of bubbles released from such a bubble-containing liquid.

The filter beds $4^1$–$4^n$ may be cylindrical and the filter members contained therein may be honeycomb plastic moldings if they can pass water therethrough smoothly. Also, the member suspending and carrying the filter beds 4 may be an ordinary chain or a flexible carrier or belt and any driving means fitted to the carrier can be used for driving the carrier. Also, in the aforesaid example the direction of the circulating water course is opposite to the direction of rotation of the filter beds, but both directions may be same. However, the counter-current system is preferred since in that case, bubbles from the diffuser attach to the filter beds before activated sludge attaches thereto, the amount of activated sludge attaching thereto afterward is less, and thus the amount of activated sludge peeled off from the filter beds by the action of bubbles is less, which results in reducing the amount of activated sludge mixed in water to be treated.

In the case of using the apparatus of this invention, the system wherein the circulating water is treated under an aerobic condition in the upwardly moving stream side and is treated under an anaerobic condition in the downwardly moving stream side of the system wherein the whole circulating water is treated under an aerobic condition may be selectively employed and such can be selected by controlling the amount of bubbles from the diffuser or by using a damper and an opening as described above. For example, the aerobic-/anaerobic system is preferably used in case of treating municipal sewage. That is, in this case, an aerobic condition is formed in the upwardly moving stream side by the bubbles from the diffuser and at the same time ammonia is oxidized therein to form nitrous acid and nitric acid. On the other hand, the water treated is supplied with BOD in the upper section of the tank and the denitrification is carried out in the downwardly moving stream side under an anaerobic condition. Thus, by repeating such cycle, BOD is removed and at the same time ammoniacal nitrogen is removed at high efficiency. In this case, best results are obtained by controlling the water transferring from the aerobic zone to the anaerobic zone by the damper.

The apparatus of the present invention has the advantage that the waste water treatment can be performed under an anaerobic condition after an aerobic condition, as well as under an aerobic condition only by closing the damper of the cavity type partition. Furthermore, since in this invention there is no need to stop the treatment operation in order to wash the filter beds, the waste treatment can be operated for a long period of time. Also, since there is less accumulation of activated sludge on the filter beds the waste treatment by this invention is not accompanied by unstable oxidation and reduction caused by the accumulation of activated sludge as in conventional apparatus and the contact effect between water to be treated and the bioactive membranes can be increased, which results in reducing greatly the period of time required for the treatment.

Moreover, in the present invention, the accumulated activated sludge on the filter beds can be effectively washed off with a small amount of water, e.g. about 1/100 of the amount required for the purpose in the conventional apparatus, and the water used for washing the filter beds for removing activated sludge does not enter water to be treated in the tank. Furthermore, a settling apparatus for separating the activated sludge from such wash water may be greatly smaller than those used in conventional systems.

What is claimed is:

1. A waste water treatment apparatus of the type having, a treatment tank including a water outlet and overflow means for determining the maximum water level in said tank, means for applying waste water to said tank, and biologically active filters in said tank for treating the waste water, the improvement comprising,
    a. said filters comprising a plurality of individual filter beds,
    b. a longitudinal partition centrally located in said tank,
    c. means connected to said filters for holding said filters separate from one another, said means comprising an endless chain to which said filter beds are swingably attached, and means for rotating said plurality of filters in said tank around said partition, said endless chain being positioned relative to said tank that some of said filter beds are above said maximum water level of said tank at any time,
    d. means for causing the water in said tank to circularize around said partition, said means comprising a bubble diffuser having an inlet port near the bottom of said tank on one side of said partition to inject bubbles into said tank on said one side, whereby the rise of said bubbles causes upward movement of said water on said one side and downward movement on the other side of said partition, and
    e. means, positioned above said maximum water level of said tank, for washing said filter beds during a portion of the time they are rotating out of said water tank.

2. A waste water treatment apparatus as claimed in claim 1 wherein said means for rotating said plurality of filter beds is adapted to rotate said filter beds in opposing direction to the circulation of said water.

3. A waste water treatment apparatus as claimed in claim 1 further comprising means for limiting the amount of dissolved oxygen in said water, due to said bubbles, from reaching said other side, whereby an aerobic treatment section and an anaerobic treatment section are provided on said one side and other side, respectively.

4. A waste water treatment apparatus as claimed in claim 3 wherein said means for limiting comprises a cavity defined by said partition and existing therein, an openable draft near the top of said partition on said one side and an opening near the bottom of said partition on said one side, both said draft and opening communicating with said cavity whereby part of the water upwardly moving on said one side can be selectively passed through said cavity back to said one side.

5. A waste water treatment apparatus as claimed in claim 4 wherein said bubble diffuser comprises, a water circulation path between said inlet port for injecting bubbles and a tank outlet port, a pump means in said path for transferring tank water from said outlet port to said inlet port, an air introducing means located in said path for introducing air bubbles into said water flowing through said path, said an introducing means having air introducing openings therein and being positioned so that tank water is forced by said pump to form a high speed liquid stream which passes over said air introducing holes in a shearing direction relative to the direction of air through said holes.

6. A waste water treatment apparatus as claimed in claim 1 wherein said bubble diffuser comprises, a water circulation path between said inlet port for injecting bubbles and a tank outlet port, a pump means in said path for transferring tank water from said outlet port to said inlet port, an air introducing means located in said path for introducing air bubbles into said water flowing through said path, said air introducing means having air introducing openings therein and being positioned so that tank water is forced by said pump to form a high speed liquid stream which passes over said air introducing holes in a shearing direction relative to the direction of air through said holes.

7. A waste water treatment apparatus as claimed in claim 1 wherein said filter beds are cylindrically shaped.

8. A waste water treatment apparatus as claimed in claim 1 further comprising means for maintaining said filter beds wet with feed water when they are rotating out of said tank but not being washed.

* * * * *